Oct. 18, 1960

T. C. KUCHLER ET AL 2,956,824

VENTED SHAFT SEAL

Filed Dec. 27, 1957

INVENTORS.
THEODORE C. KUCHLER, &
ERNEST J. TASCHENBERG.
BY Fred P. Kostka
their
ATTORNEY.

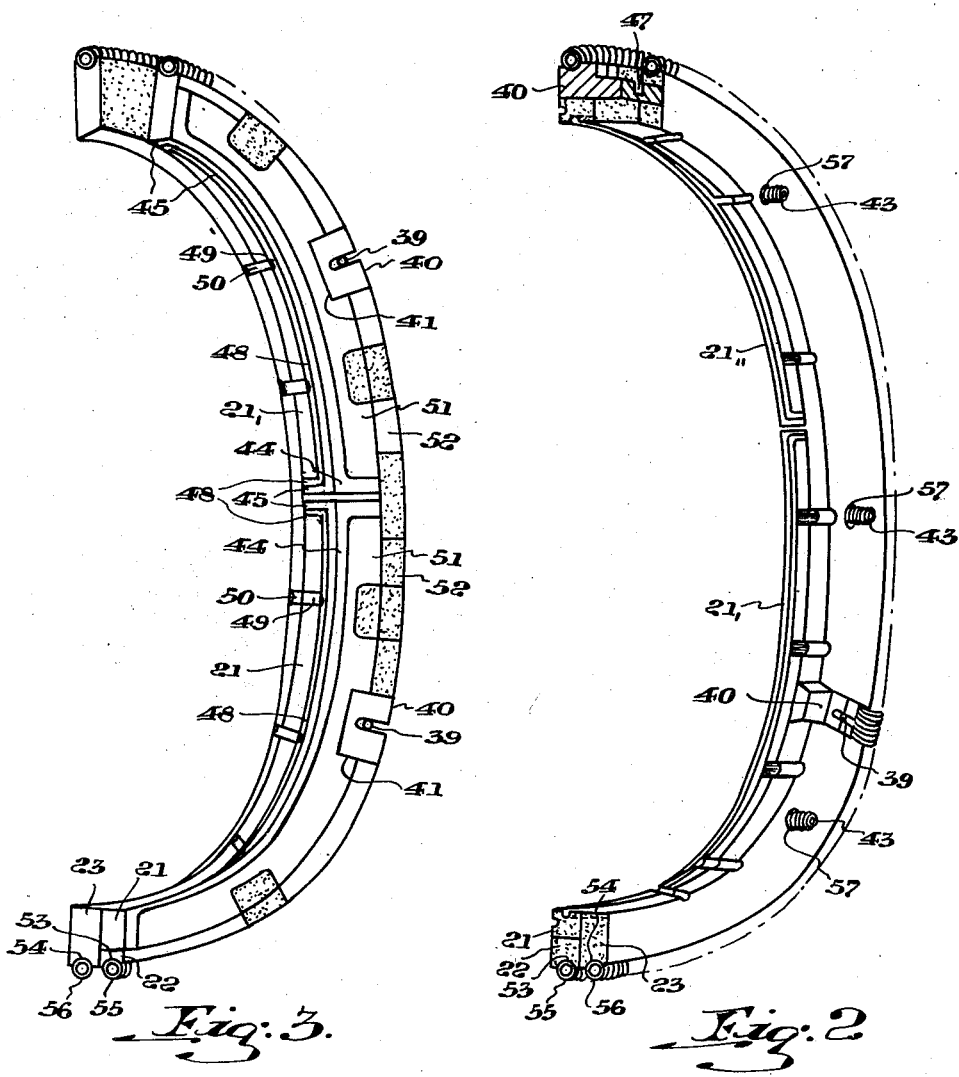

United States Patent Office 2,956,824
Patented Oct. 18, 1960

2,956,824

VENTED SHAFT SEAL

Theodore C. Kuchler and Ernest J. Taschenberg, Baltimore, Md., assignors to Koppers Company, Inc., a corporation of Delaware Filed Dec. 27, 1957, Ser. No. 705,607

7 Claims. (Cl. 286—8)

This invention generally relates to the sealing of a rotating shaft into fluid tight chambers along the shaft and more particularly relates to a sealing assembly for jet engine shafts which operate under extreme speed, temperature and pressure conditions.

Conventional sealing assemblies for rotating shafts employ a stationary seal case attached to a housing for the shaft. A sealing ring of anti-friction material such as metal, and/or carbon is contained within the seal case and bears against the circumference of a runner carried by the shaft and against the seal case to form a substantially fluid tight seal about the shaft. These seals have been satisfactory at low shaft speeds, low temperature, and low pressure. Difficulties, however, have been experienced in maintaining the frictional surfaces fluid tight with most assemblies, particularly under extreme conditions of speed, temperature and pressure as are present in such structures as jet engines. The metal and carbon sealing rings particularly are subject to early failure under such extreme conditions and thereby are rendered ineffective to prevent leakage along the shaft.

An object of the present invention is to provide a sealing arrangement constructed in a manner such that the difficulties encountered heretofore are overcome.

Briefly, this is accomplished by providing means for minimizing the temperature which is present at the frictionally contacting surfaces of the sealing member to prevent the rapid deterioration of the frictional surfaces.

This invention contemplates an arrangement comprising a seal case mounted on the housing for the shaft, a runner on the shaft, a sealing ring having a plurality of circumferential sections in frictional contact with each other, means for urging said sections into contact with the seal case and the runner, means for communicating the pressure on opposite side surfaces of said sections whereby the opposed side surfaces of the ring sections are substantially balanced although a pressure differential exists across the sealing ring, and a jet for circulating a coolant in the vicinity of the frictionally contacting surfaces of the sealing ring and the runner whereby the temperature created by the presence of high shaft velocity and exterior temperatures and pressures is decreased and heat is directed away from and prevented from concentrating at the frictionally contacting surfaces of the sealing ring and the runner.

Above and further objects and novel features of the invention will appear more fully from the following detailed description when the same is read in connection with the accompanying drawings. It is to be expressly understood, however, that the drawings are not intended as a definition of the invention but are for the purpose of illustration only.

Referring to the drawings which illustrate several embodiments of the invention, the reference numerals of which indicate like parts:

Fig. 2 is an isometric cut-away view of the sealing ring of Figure 1;

Fig. 3 is an isometric cut-away view of the opposite side of the sealing ring of Figure 2;

Figure 1:
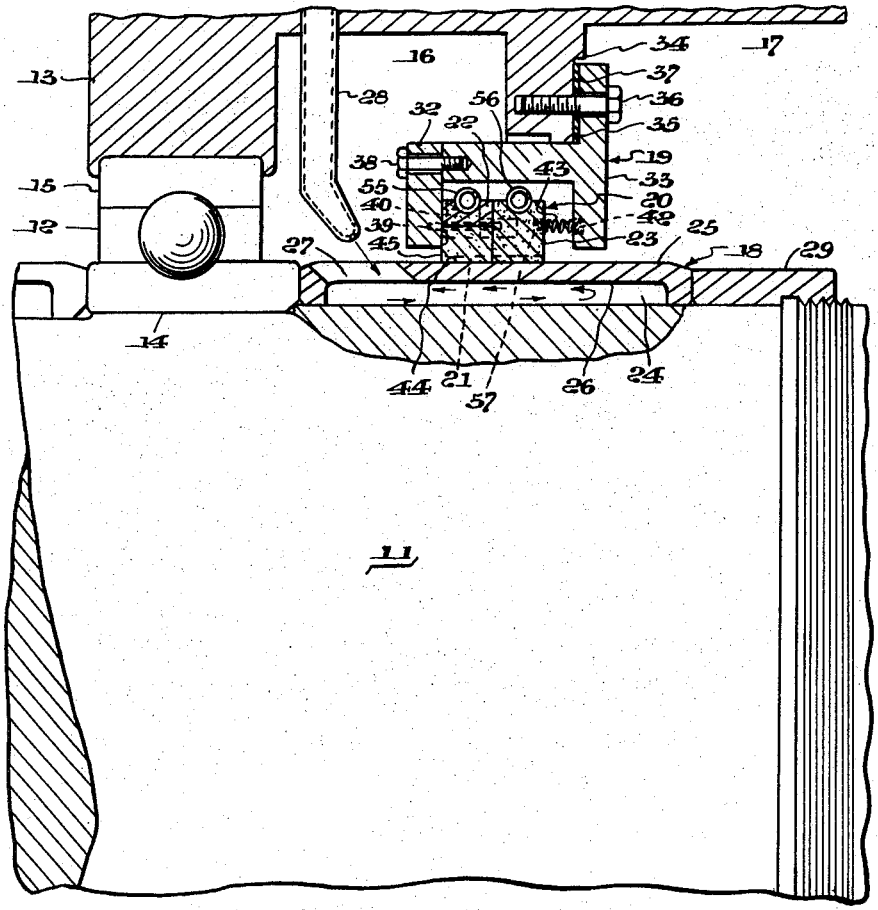
Fig. 1 is a fragmentary front elevational view, partially in cross section, of the shaft sealing arrangement of the invention in conjunction with a metal shaft.

Referring now to Figure 1, shaft 11 may be any shaft, but is illustrated in this embodiment as a main compressor and turbine shaft for a jet engine. Shaft 11 rotates at high speed; and due to expansion and contraction the shaft moves axially; and due to bending of the shaft, bearing clearance, and the like, the shaft also moves radially. Thus, the shaft has three directions of movement.

A bearing 12, illustrating one of several bearings located around the main shaft 11, for the free rotation of shaft 11 in housing 13 has an inner race 14 and outer race 15. Conventionally the inner race 14 is attached to the shaft 11 and the outer race 15 is attached to the jet housing 13.

The bearing 12 is located in a compartment 16 similar to compartments present at other bearing locations along the shaft 11 and is protected from hot air at a location 17 outside the compartment 16 by a runner 18, seal case 19 and sealing ring 20 the latter being made up of three rings 21, 22, and 23 which are substantially rectangular in cross section and which overlap each other. These components prevent the escape of oil from compartment 16 to location 17 including lubrication that is supplied to the bearing from a suitable source. These elements also substantially seal outside hot air at the location 17 from entering into compartment 16.

Runner 18, substantially U shaped in cross section, surrounds shaft 11. The free ends of runner 18 rest on shaft 11 so as to provide a chamber 24 having an outside frictional surface 25, an inside cooling surface 26. Apertures 27 which are disposed around the circumference of runner 18 in an annular array are disposed toward one side of the runner 18 for communicating with the chamber 24 and for circulating in chamber 24 oil from a jet 28 which is rigidly attached to housing 13 by suitable means well known in the art the oil jet being located in compartment 16. These apertures 27 may be uniform in cross section or their sides may be tapered to the axis of shaft 11. Advantageously runner 18 is made with materials having high heat conductivity, high strength and stability at high temperatures. Thus, runner 18 may be solid or may be plated with wear-resistant coatings such as chromium, ceramics, metal oxides or metal carbides.

Runner 18 is secured to shaft 11 so as to turn with the shaft. For this purpose a locking nut 29 is provided which advantageously threads on shaft 11 in a fluid tight manner so as to hold runner 18 firmly and rigidly against the inner race 14 of bearing 13, however, other suitable means of connection well known in the art may be used. The contacting surfaces of the locking nut 29 and the runner 18 are lapped to make a fluid tight joint.

Seal case 19 comprises an annular element 32 which has two substantially parallel sides, one side being in frictional contact with sealing rings 21 and 22 and annular element 33 which is substantially T shaped in cross section. Element 33 fits into two shoulders 34 and 35 in housing 13 which serve to locate the seal case 19 with respect to shaft 11 and an annular array of bolts 36 are provided with a suitable gasket 37 to lock the seal case 19 to housing 13 in a fluid tight manner. Seal case elements 32 and 33 are connected by suitable means such as an annular array of bolts 38 which are disposed around the circumference of the two seal case elements 32 and 33 to provide a fluid tight joint. To hold seal ring 20 against rotation within the seal case 19 pins 39 are provided around the circumference of seal case element 32 which are adapted to be inserted in keys 40 which are disposed between the end clearances of rings 22 and 23 and in recesses 41 in sealing ring 21. Seal case 19 also has a circumferential indentation 42 in seal case element 33 for the insertion of radial compression springs 43 which urge seal ring 20 against the side of seal case element 32. Both of the seal case elements 32 and 33 are designed to have small clearances between their inside diameters and runner 18 to allow limited radial movement of shaft 11 when the seal case 19 is mounted in the jet engine housing 13.

Sealing ring 20, which is shown in greater detail in U.S. Patent No. 2,908,516 assigned to the assignee of the instant invention, provides a substantially fluid tight seal between seal case 19 and runner 18 and is made up of three separate segmental rings 21, 22, and 23 to allow movement of shaft 11 in a radial and axial direction, and so that any pressure differential across the shaft may be substantially balanced thereby, in a manner to be described hereinafter, to reduce friction between the seal ring 20 and the runner 18. This balancing is important because normally there is no lubrication between the frictional surfaces of seal ring 20 and runner 18 for the reasons as described hereinafter.

Segmental ring 21 is advantageously comprised of six segments (two of which $21_I$ and $21_{II}$ are shown) which are substantially flat on two sides and substantially circumferential on two sides. A dam 44 on one flat side of each segment forms a surface around the entire circumference of the ring 21 and axially at the end of each segment which contacts the frictional flat of seal case element 32 to form a substantially fluid tight seal therewith. A dam 45 on one circumferential side of each segment forms a surface around the entire circumference of the ring 21 and radially at the end of each segment which contacts runner 18 to form a substantially fluid tight seal therewith.

Each segment of segmental ring 21 contains a recess 41 on the circumferential side opposite dam 44 intermediate the segment ends in which keys 40 are located so as to prevent rotation of these segments with the runner 18. The keys 40 have longitudinal hollows 47 for the insertion of the pins 39. These keys 40 are substantially L shaped in cross section and are inserted between the end clearances of segmental rings 22 and 23 respectively, to prevent their rotation with runner 18.

Segmental ring 22 surrounds segmental ring 21 on the circumferential side of the latter opposite dam 44 so that the joints of ring 21 are covered and the segmental ring 22 seals with segmental ring 21 and with seal case element 32 across the joints of the segmental ring 21.

Segmental seal ring 23 which is disposed axially of rings 21 and 22, has a radial dimension approximately equal to the combined radial dimensions of rings 21 and 22. Ring 23 covers both segmental rings 21 and 22 on their flat sides opposite their sides in frictional contact with seal case element 32 and ring 23 contacts runner 18 so that a substantially fluid tight seal is formed between these three segmental rings 21, 22 and 23 across the joints of the segmental ring 21 with runner 18.

To balance the pressures on the ring 20, there is provided in ring 21 one circumferential groove 48 adjacent dam 45 which is terminated in each segment just short of its gap or end clearance by the radial extension of dam 45. A plurality of axial grooves 49 in ring 21 radiate from groove 48 and communicate with similar axial grooves 50 in segmental ring 23. These axial grooves 49 and 50 are located adjacent the runner 18 and communicate with each other so as to flow fluid pressure from dam 44 on its side adjacent circumferential grooves 48 across segmental rings 21 and 23 to the outside circumferential side of ring 22 so that radial pressure on seal ring 20 is substantially balanced. The segmental ring 21 also contains a plurality of rectangular cut-out portions 51 adjacent dam 44 which communicates with similar cut-out portions 52 on segmental ring 22. These cut-out portions communicate fluid pressure from dam 44 across the flat sides of segmental ring 21 and 22 adjacent the frictional flat of seal case element 32 to the flat side of ring 23 farthest from seal case element 49 so that axial pressure on seal ring 20 is substantially balanced. To reduce viscous drag between segments 23 and 21 and 22 a similar cut-out portion of the radial face of ring 23 in contact with rings 21 and 22 may be employed. However, these areas of the radial faces of the segments of the ring 23 which overlap the gaps between segments of ring 21 must not have cut-out portions.

To hold the segmental rings 21 and 23 against shaft 11, grooves 53 and 54 are provided on the outside circumferential surfaces of rings 22 and 23 for receiving external garter springs 55 and 56. To hold the ring 20 against seal case element 32, each segment of ring 23 contains two holes 57 on the flat side opposite the side in frictional contact with rings 21 and 22, holes 57 adjacent with the circumferential indentation 42 in seal case element 33, and compression springs 43 interposed between holes 57 and indentation 42 of seal case 19 which urge the rings 21 and 22, i.e., assembled sealing ring 20, against the frictional flat of seal case element 32.

These segments of sealing ring 20 may be made of carbon or other high temperature wear-resistant materials, and springs are made with materials which are resistant to physical and chemical change at high temperatures so that their spring rate will remain substantially constant.

The foregoing arrangement of seal case 19, sealing ring 20, and runner 18 provides a substantially fluid tight barrier between the compartment 16 and the outside 17. Normally a pressure differential exists between the compartment 16 and the outside 17, the pressure at the outside 17 usually being greater and containing hot air under high pressure. Compartment 16 is usually substantially filled with air and oil mist under little or no pressure, the temperature being much lower than the air at outside 17 of compartment 16.

The contacting of surface 25 with seal ring 20 as the runner 18 rotates generates heat; to remove this heat and heat conducted by runner 18 from outside 17, oil is flowed into chamber 24 by oil jet 28. This oil jet 28 contains a calibrated hole 59 for controlling the flow and velocity of the oil. Advantageously the oil from jet 28 is directed against the outside surface 25 of runner 18 at an angle to the axis of shaft 11 so that it passes through the apertures 27 into cooling chamber 24 and against shaft 11 from whence it is deflected and slung by centrifugal force against the inside cooling surface 26 of the runner 18. By contacting this cooling surface 26 and being circulated in cooling chamber 24 the oil picks up heat conducted by runner 18 from the frictional surfaces of sealing ring 20 and runner 18 and from the hot air at the outside 17 of compartment 16. The oil, after cooling surface 26, is then carried out of apertures 27 and collected and cooled by suitable means (not shown) for recirculating through jet 28 into cooling chamber 24.

In the embodiment of Fig. 1 some oil from jet 28 is deflected toward the frictional surfaces of runner 18 and sealing ring 20 due to the high velocity of the oil stream coming out of jet 28 and the angle of the oil stream as it hits surface 25 in between apertures 27 as runner 18 rotates. Under normal conditions, however, wherein the air pressure at location 17 is greater than in compartment 16 there is a small amount of leakage of air between the frictional surfaces of sealing ring 20 and runner 18 from location 17 to compartment 16 and therefore no oil in compartment 16 which could provide lubrication can reach these frictional surfaces. When there is no pressure differential between location 17 and compartment 16 or when the pressure is slightly higher in compartment 16 than at location 17 there is no oil between frictional surfaces, because the sealing ring 20 provides fluid tight seal under these conditions. Preventing oil from reaching these frictional surfaces is an important function of sealing ring 20 because the oil would coke in the grooves of the segment of sealing ring 20 due to the high frictional temperatures therebetween and the high ambient temperature at location 17. Furthermore, there would be great danger of fire if oil leaked into location 17 because the air temperature at location 17 normally exceeds 500°.

Figure 4:
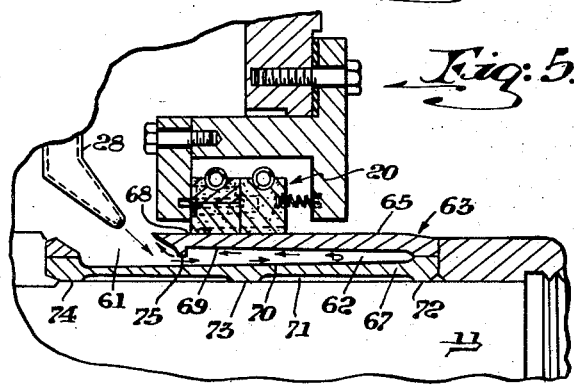
Fig. 4 is a fragmentary view of another embodiment of the invention.

The embodiment of Fig. 4 includes an oil trough 61 open at both sides which extends around the periphery of the runner for the entry of cooling fluid from jet 28 into cooling chamber 62 whereas the runner 18 in Fig. 1, has a plurality of apertures arranged around the circumference of runner 18. This trough may be cut at an angle to shaft 11 or be of uniform cross section. To this end runner 63 is made with two elements 65 and 67 which are substantially U shaped in cross section and which are connected by suitable means such as by brazing. The outside surface 68 of element 65 functions as the frictional sealing surface of runner 63 which contacts sealing ring 20 and the inside surface 69 operates as the cooling surface in a manner similar to that described above with relation to the cooling surface 26 of Fig. 1. The hollow space presented between elements 65 and 67 provides a cooling chamber 62 which functions in a manner equivalent to that of cooling chamber 24 of Fig. 1 but since element 65 is cantilevered substantially all the oil from jet 28 is directed against the bottom surface 70 of chamber 62. The embodiment in Fig. 4 also includes a dead air space 71 between the shaft 11 and the cooling chamber 62 provided between shoulders 72, 73 and 74 which rest on shaft 11 an oil collecting ridge 75 on cooling surface 69 at the end of chamber 62 closest jet 28, and the tapers on the walls of chamber 62 opposite to the axis of shaft 11 may be provided as shown, whereas the runner 18 in Fig. 1, has none of these. The dead air space 71 functions to insulate the runner 68 from heat conducted by shaft 11; the oil collecting ridge 75 operates to help accumulate oil along the cooling surface 69; and the tapered cooling chamber walls help to insure an increased flow of oil over the cooling surface 69. A dead air space, a collecting ridge, and tapered cooling chamber walls may be used separately or in combination in the embodiment of Fig. 1 and Fig. 3 together with a cooling fluid trough as shown in Fig. 4, and Fig. 1 is in no way limited to the embodiment shown because all of these features of Fig. 4 described have been shown in practice to increase the effectiveness of the cooling operation from the oil directed by jet 28. The tapering of the cooling chamber walls at opposite angles axially of shaft 11, as is shown in Fig. 4, has especially proven helpful in increasing the effectiveness of the oil cooling operation because centrifugal force tends to carry the oil directed against surface 70, up the slope which surface 70 presents, to the end of the runner 63 opposite the oil trough 61 and centrifugal force tends to carry the oil slung against surface 69 along the surface 69 to oil trough 61 so that the oil is effectively removed after serving its cooling function.

Figure 5:
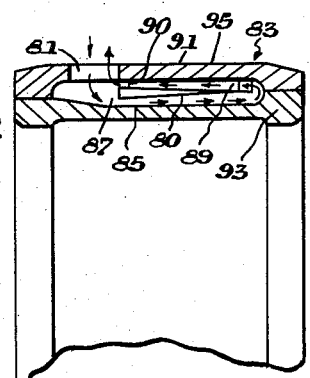
Fig. 5 is a fragmentary view of a further embodiment of this invention.

The embodiment of Fig. 5 includes an oil directing rib 80 between the bottom and the top of the cooling chamber and this differs from the embodiment shown in Fig. 4 where there is no such rib in the cooling chamber. Oil is directed at an angle to the axis of shaft 11 through apertures 81 or perpendicularly to the axis of shaft 11 and as the runner 83 rotates oil from jet 28 flows through these apertures 81, as shown, by flow arrows like those of Figures 1 and 4 to the bottom surface 85 of cooling chamber 87 from whence the oil is directed by the taper on rib 80 and the action of centrifugal force to the end of runner 83 opposite from apertures 81 and then to cooling surface 89. The action of centrifugal force also causes the oil to flow along cooling surface 89 through apertures 90 at the end of rib 80 closest apertures 81 and then out apertures 81 for collection at the bottom of chamber 16 (not shown) for cooling and for recirculation into chamber 87 from jet 28. Runner 83 is made up of elements 91 and 93 as well as rib 80 which are connected by suitable means such as by brazing. Frictionally sealing surface 95 is in contact with sealing ring 20 and operates therewith in a manner similar to that described above with relation to Fig. 1.

The foregoing has described a sealing arrangement for preventing leakage along the surface of a rotating shaft. This arrangement includes a seal case fixed to a housing, a segmental sealing ring fixed to the seal case, and a runner fixed to a shaft. The sealing ring segments are balanced to decrease frictional heat generated by the rubbing of the surfaces of the segmental sealing elements and the rotating runner which are in contact. Provision for internal cooling of the runner is made in the form of a chamber between the runner and the shaft and circulating oil therein which cools the runner thereby increasing the wear life of sealing elements at increased conditions of temperature, shaft speed and pressure. The frictional surfaces of the sealing ring and runner are not lubricated and provision is made for, thereby insuring no oil leakage.

Although the foregoing has illustrated and described the invention in detail, it is to be expressly understood that the invention is not limited thereto. Various changes can be made in the design and arrangement of the parts without departing from the spirit and scope of the invention as will now be understood by those skilled in the art.

The invention claimed is:

1. A heat conducting runner for a circumferential seal having a fluid cooling jet adjacent said runner for directing a stream of cooling fluid in a direction substantially normal to the axis of said runner, comprising a cantilevered heat conducting wall having an external rubbing surface in sealing contact with said seal and an internal tapered cooling surface enclosing a chamber which is open at the free end of said wall, a rib connected to said wall in said chamber so as to support one end of said wall, said rib having an internal first passageway extending from adjacent the free end of said wall to the fixed end of said wall and forming with said internal surface a second passageway communicating with said first passageway and extending from adjacent the supported end of said wall to the free end of said wall, said first passageway being tapered so as to carry fluid by centrifugal force from said jet to the end of said second passageway adjacent the supported end of said wall, said second passageway being tapered so as to carry fluid by centrifugal force from said second passageway along said internal surface to the free end of said wall, means attached to said rib for deflecting a fluid stream from said jet into said first passageway, and means for fixing said rib to a rotatable shaft so that said rib may be rotated whereby fluid deflected into said first passageway is circulated in said first and second passageways to cool said wall.

2. In a fluid seal arrangement for forming a dry substantially fluid tight seal about the circumference of a rotatable shaft and which includes a fixed annular seal having an internal circumferential rubbing surface, an arrangement for reducing the operating temperatures at said rubbing surface of said seal comprising: a heat conducting runner fixed to said shaft for rotation therewith, said runner having an external circumferential rubbing surface substantially parallel to the longitudinal axis of said shaft and in lubricant free frictional engagement with said internal surface of said annular seal; a fluid circulating chamber extending longitudinally beneath the area of frictional engagement of said rubbing surfaces between said internal rubbing surface and said shaft of which at least one wall of said chamber is formed in said runner to serve as a cooling surface, said runner having a fluid inlet communicating with said chamber remote from said area of frictional engagement of said rubbing surfaces and having a closed end wall; and means for directing and circulating fluid through said fluid inlet into said chamber and against said cooling surface of said heat conducting runner whereby the temperature of said rubbing surfaces of said runner and said seal is minimized.

3. In a fluid seal arrangement for forming a dry substantially fluid tight seal about the circumference of a rotatable shaft and which includes a fixed annular seal having an internal circumferential rubbing surface, an arrangement for reducing the operating temperatures at said rubbing surface of said seal comprising: a heat conducting runner fixed to said shaft for rotation therewith, said runner having an external circumferential rubbing surface substantially parallel to the longitudinal axis of said shaft and in lubricant free frictional engagement with said external surface of said annular seal; a plurality of spaced longitudinally extending fluid circulating chambers between said external rubbing surface and said shaft of which at least one wall of each of said chambers is formed in said runner to serve as a cooling surface; and means for directing and circulating fluid into said chambers and against said cooling surfaces of said heat conducting runner whereby the temperature of said rubbing surfaces of said runner and said seal is minimized.

4. In a fluid seal arrangement for forming a dry substantially fluid tight seal about the circumference of a rotatable shaft and which includes a fixed annular seal having an internal circumferential rubbing surface, an arrangement for reducing the operating temperatures at said rubbing surface of said seal comprising: a heat conducting runner in the form of an elongate cylinder fixed to said shaft for rotation therewith, said cylinder having an external circumferential rubbing surface substantially parallel to the longitudinal axis of said shaft and in lubricant free frictional engagement with said internal surface of said annular seal; a fluid circulating chamber extending longitudinally beneath the area of frictional engagement of said rubbing surfaces between said external rubbing surface and said shaft of which one wall is formed in said runner to serve as a coding surface, said chamber having a fluid inlet remote from said frictional engagement of said rubbing surfaces and a closed end wall and a second wall is formed by the periphery of said shaft; and means for directing and circulating fluid from said inlet into said chamber and against said cooling surface of said runner whereby the temperature of said rubbing surfaces of said runner and said seal is minimized.

5. The invention as claimed in claim 4 in which said cooling surface is substantially parallel to said external rubbing surface.

6. In a fluid seal arrangement for forming a dry substantially fluid tight seal about the circumference of a rotatable shaft and which includes a fixed annular seal having an internal circumferential rubbing surface, an arrangement for reducing the operating temperatures at said rubbing surface of said seal comprising: a heat conducting runner fixed to said shaft for rotation therewith, said runner having an external circumferential rubbing surface substantially parallel to the longitudinal axis of said shaft and in frictional engagement with said internal surface of said annular seal; a fluid circulating chamber provided in said runner extending longitudinally beneath the area of frictional engagement of said rubbing surfaces and of which the longitudinally extending walls thereof serve as a cooling surface; said runner having a fluid inlet communicating with said chamber remote from said area of frictional engagement of said rubbing surfaces and having a closed end wall; and means for directing and circulating fluid through said inlet into said chamber and against said cooling surfaces of said runner whereby the temperature of said rubbing surfaces between said runner and said seal is minimized.

7. In a fluid seal arrangement for forming a dry substantially fluid tight seal about the circumference of a rotatable shaft and which includes a fixed annular seal having an internal circumferential rubbing surface, an arrangement for reducing the operating temperatures at said rubbing surface of said seal comprising: a heat conducting runner fixed to said shaft for rotation therewith, said runner having an external circumferential rubbing surface substantially parallel to the longitudinal axis of said shaft and in frictional engagement with said internal surface of said annular seal; a fluid circulating chamber provided in said runner extending longitudinally beneath the area of frictional engagement of said rubbing surfaces and of which the longitudinally extending walls thereof are tapered toward one end; said runner having a fluid inlet communicating with said chamber at the area of greater cross-section remote from said area of frictional engagement of said rubbing surfaces and having a closed end wall at the area of smaller cross-section; and means for directing and circulating fluid through said inlet into said chamber and against said cooling surfaces of said runner whereby the temperature of said rubbing surfaces between said runner and said seal is minimized.

References Cited in the file of this patent

UNITED STATES PATENTS

| | | |
|---|---|---|
| 1,072,679 | Waycott | Sept. 9, 1913 |
| 2,162,218 | Hill | June 13, 1939 |
| 2,647,771 | Grobel | Aug. 4, 1953 |
| 2,820,653 | Yokel | Jan. 21, 1958 |
| 2,857,182 | Bain et al. | Oct. 21, 1958 |

UNITED STATES PATENT OFFICE
CERTIFICATION OF CORRECTION

Patent 2,956,824                          October 18, 1960

Theodore C. Kuchler et al.

It is hereby certified that error appears in the above numbered patent requiring correction and that the said Letters Patent should read as corrected below.

Column 7, line 16, for "reducting" read -- reducing --; line 51, for "from" read -- through --.

Signed and sealed this 6th day of June 1961.

(SEAL)
Attest:

ERNEST W. SWIDER
Attesting Officer

DAVID L. LADD
Commissioner of Patents